United States Patent
Chang et al.

(10) Patent No.: US 8,363,111 B2
(45) Date of Patent: Jan. 29, 2013

(54) RESOLUTION TEST DEVICE AND METHOD THEREOF

(75) Inventors: Ku-Nien Chang, Miaoli County (TW); Wen-Chun Chen, Hsinchu County (TW)

(73) Assignee: Altek Corporation, Hsinchu (TW)

( * ) Notice: Subject to any disclaimer, the term of this patent is extended or adjusted under 35 U.S.C. 154(b) by 33 days.

(21) Appl. No.: 13/197,735

(22) Filed: Aug. 3, 2011

(65) Prior Publication Data
US 2012/0274788 A1 Nov. 1, 2012

(30) Foreign Application Priority Data
Apr. 27, 2011 (TW) .............................. 100114684 A

(51) Int. Cl.
H04N 17/00 (2006.01)
(52) U.S. Cl. ........................................ 348/188; 348/187
(58) Field of Classification Search .................. 348/188, 348/180, 181, 187; 358/504; 455/67.11, 455/67.14; 702/108; H04N 17/00, 17/02
See application file for complete search history.

(56) References Cited

U.S. PATENT DOCUMENTS
5,799,105 A * 8/1998 Tao ................................ 348/187
2010/0259622 A1 * 10/2010 Steinberg et al. ............. 348/187

* cited by examiner

*Primary Examiner* — Sherrie Hsia
(74) *Attorney, Agent, or Firm* — Jianq Chyun IP Office

(57) ABSTRACT

A resolution test device and a method thereof are provided. The resolution test method is adapted for testing a resolution of a camera device. The resolution test method includes providing a graph to the camera device, capturing a test image shot by the camera device, shifting an analyzing window a specific distance in a first direction from a static area to a first area on the test image, analyzing the first area to generate a first high-pass element, shifting the analyzing window back to the static area, shifting the analyzing window the specific distance in a second direction from the static area to a second area on the test image, analyzing the second area to generate a second high-pass element, generating a third high-pass element according to the first and the second high-pass element, and defining the resolution of the camera device according to the third high-pass element.

11 Claims, 7 Drawing Sheets

RESOLUTION TEST DEVICE AND METHOD THEREOF

CROSS-REFERENCE TO RELATED APPLICATION

This application claims the priority benefit of Taiwan application serial no. 100114684, filed on Apr. 27, 2011. The entirety of the above-mentioned patent application is hereby incorporated by reference herein and made a part of this specification.

BACKGROUND OF THE INVENTION

1. Field of the Invention

The present invention relates to a resolution test device and a method thereof, and more particularly, to a test device and a method for testing the short-distance resolution of a camera device.

2. Description of Related Art

At present, the short-distance resolution of a camera needs to be tested during manufacture process. In a typical test method, contrast transfer function chart (CTF chart) is generally used to calculate the resolution. A to-be-calculated small area on an image outputted by a sensor is selected to calculate the lens resolution. However, this type of test brings errors due to positions of the camera or fixture or assembly of the sensor.

As to the selection of frequency of the CTF chart, if the frequency of the CTF chart is too low, i.e. the width of the black bar and the white bar is too large, the calculation will have inadequate accuracy. For example, in FIG. 1, seven black bars are in a dotted line framed area 110. After shifted, the solid line framed area 120 frames eight black bars. The high-pass elements of these two areas are different, and the corresponding resolutions are also different, thus causing instability of the test. In addition, in the contrast value test results of FIG. 2, multiple numbers of the movement steps of a focusing lens correspond to the same contrast value, i.e. the low frequency CTF chart may also cause the test inaccuracy as in FIG. 2. A CTF pattern with higher frequency is usually used to overcome this problem. However, the high frequency CTF pattern also makes it difficult to achieve uniform calibration of the fixtures along the product line and also difficult to fabricate the fixtures, thus resulting in a high cost. As a result, the product line often lacks of a good and uniform test system for testing the short-distance resolution of the lens.

SUMMARY OF THE INVENTION

The present invention provides a resolution test device adapted for testing a resolution of a camera device. The resolution test device includes a test module and an analysis module. The test module is adapted for providing a graph and causing the camera device to shoot a test image of the graph. The analysis module is coupled to the camera device and adapted for capturing the test image shot by the camera device. The analysis module is configured such that an analyzing window of the analysis module shifts a specific distance in a first direction from a static area to a first area on the test image, and the analysis module analyzes the first area to generate a first high-pass element; the analyzing window shifts back to the static area and shifts the specific distance in a second direction from the static area to a second area on the test image, and the analysis module analyzes the second area to generate a second high-pass element; a third high-pass element is generated according to the first high-pass element and the second high-pass element; and the resolution of the camera device is defined according to the third high-pass element.

In one embodiment of the present invention, the test module includes a graph unit and a fixture unit. The graph unit provides the graph and uniform illumination. The fixture unit fixes the camera device and causes the camera device to shoot the test image of the graph.

In one embodiment of the present invention, the first direction and the second direction are opposite to each other and parallel.

In one embodiment of the present invention, the graph is a contrast transfer function chart (CTF chart) consisting of a bar pattern of multiple alternately arranged black bars and white bars, the width of each black bar and each white bar is N pixels, the specific distance of the shift in the first direction is X pixels, the specific distance of the shift in the second direction is Y pixels, where X+Y=N, and X and Y are each an integer. That is, the first direction and the second direction are parallel and spaced a distance of N pixels.

In one embodiment of the present invention, the first high-pass element is a first calculation result calculated on the first area using a symmetric high-pass filter, and the second high-pass element is a second calculation result calculated on the second area using the symmetric high-pass filter.

In one embodiment of the present invention, the third high-pass element is an average of the first high-pass element and the second high-pass element.

The present invention provides a resolution test method adapted for testing a resolution of a camera device. The resolution test method includes providing a graph and causing the camera device to shoot a test image of the graph, shifting an analyzing window a specific distance in a first direction from a static area to a first area on the test image, capturing the test image shot by the camera device, analyzing the first area to generate a first high-pass element, shifting the analyzing window back to the static area, shifting the analyzing window the specific distance in a second direction from the static area to a second area on the test image, analyzing the second area to generate a second high-pass element, generating a third high-pass element according to the first high-pass element and the second high-pass element; and defining the resolution of the camera device according to the third high-pass element.

In view of the foregoing, the present invention provides a resolution test device and method thereof. While the low frequency CTF chart is used to test the resolution of the camera device, the test can still achieve the high stability and high accuracy which would conventionally require a high frequency CTF chart to achieve.

Other objectives, features and advantages of the present invention will be further understood from the further technological features disclosed by the embodiments of the present invention wherein there are shown and described preferred embodiments of this invention, simply by way of illustration of modes best suited to carry out the invention.

DESCRIPTION OF THE EMBODIMENTS

Figure 3A:
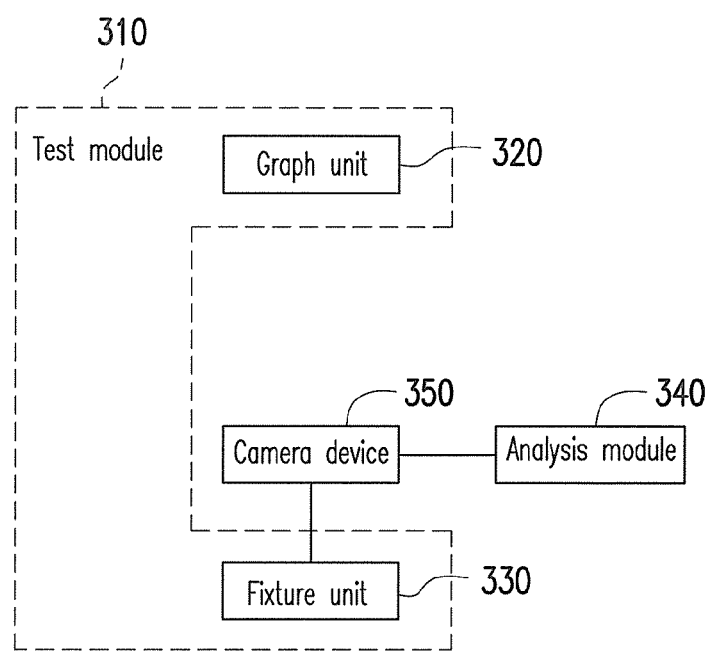
FIG. 3A and FIG. 3B are functional block diagrams of a resolution test device according to one embodiment of the present invention.
Figure 3B:
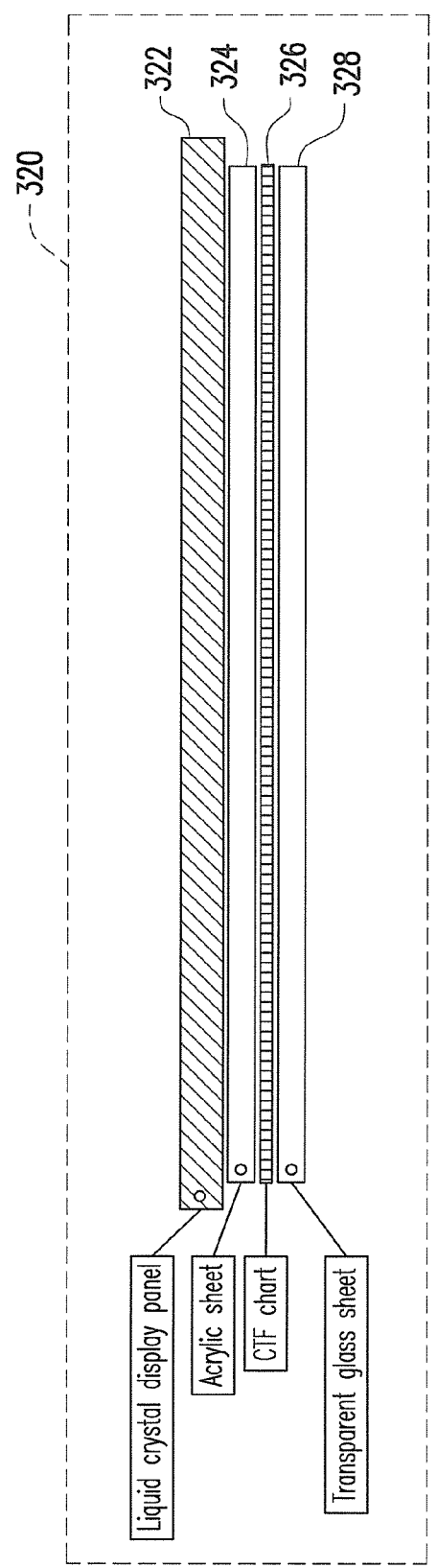
Figure 4:
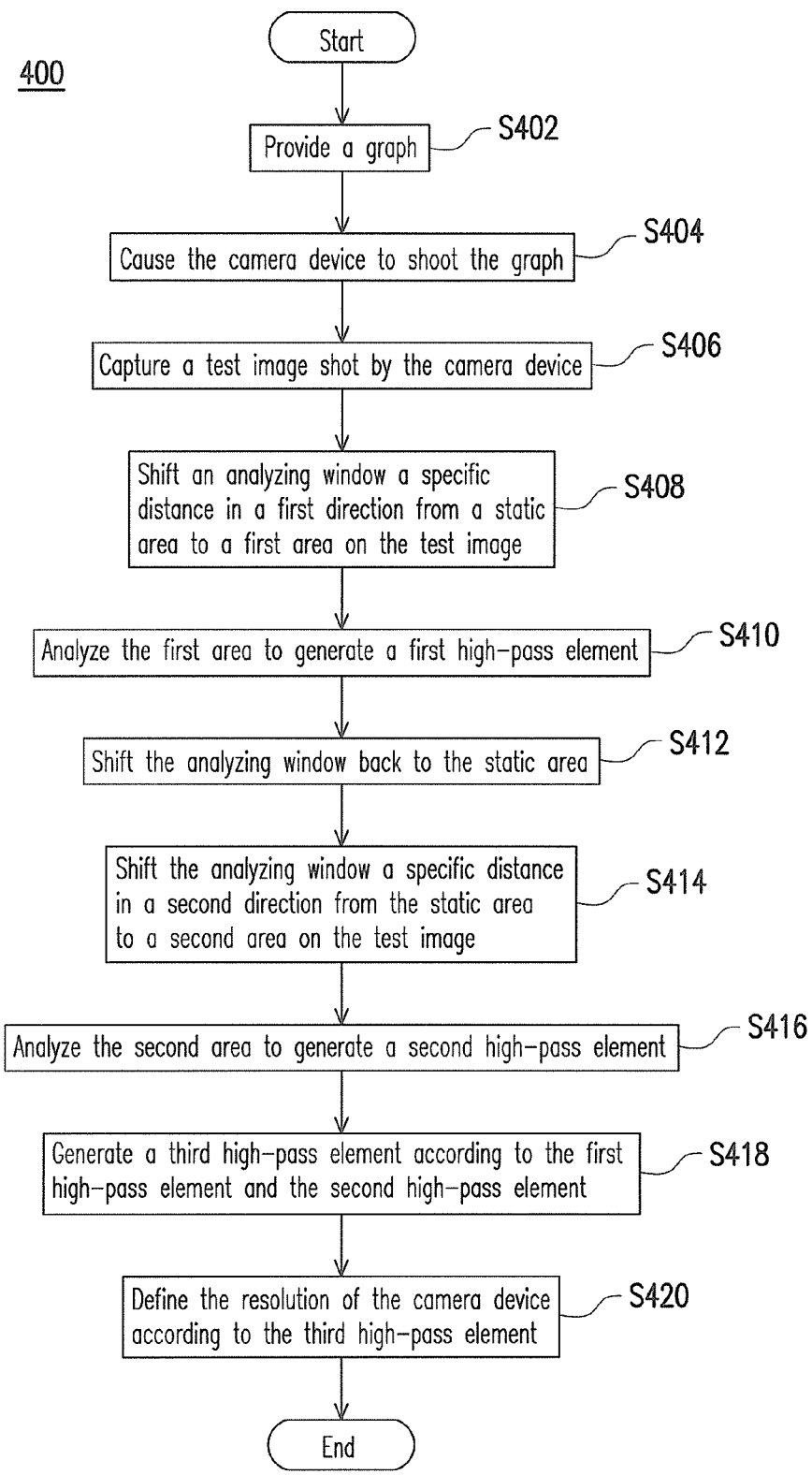
FIG. 4 is a flow chart of a resolution test method according to one embodiment of the present invention.

FIG. 3A and FIG. 3B are functional block diagrams of a resolution test device 300 according to one embodiment of the present invention. FIG. 4 is a flow chart of a resolution test method 400 according to one embodiment of the present invention. The resolution test device 300 includes a test module 310 and an analysis module 340. The test module 310 includes a graph unit 320, a fixture unit 330. The resolution test device 300 is used to test the resolution of a camera device 350. The camera device 350 may be an electronic device with camera function, such as, a camera, a mobile phone, a personal digital assistant (PDA) or a tablet PC. The analysis module 340 may be an electronic device with general processor functions, such as, a desktop computer, a notebook computer, a tablet PC or a mainframe.

The graph unit 320 includes a liquid crystal display panel 322 for providing uniform illumination, an acrylic sheet 324, a contrast transfer function chart (CTF chart) sheet 326 for providing a graph to be shot, and a transparent glass sheet 328. The graph unit 320 of the test module 310 provides a graph to the camera device 350 with its CTF chart sheet 326, allowing the camera device 350 to shoot a test image. The liquid crystal display panel 322 provides uniform illumination to the transparent CTF chart sheet 326. The acrylic sheet 324 and the transparent glass sheet 328 assist fixing of the graph unit 320. It is noted that the overall structure of the graph unit 320 is not intended to be limited to those described above. Rather, various modifications can be made without departing the spirit and scope of the present invention.

Referring to FIG. 3A, FIG. 3B and FIG. 4, first, the CTF chart sheet 326 of the test module 310 first provides a graph (step S402) and the camera device 350 is caused to shoot a test image of the graph (step S404). The analysis module 340 then captures the test image shot by the camera device 350 (step S406).

Figure 5:
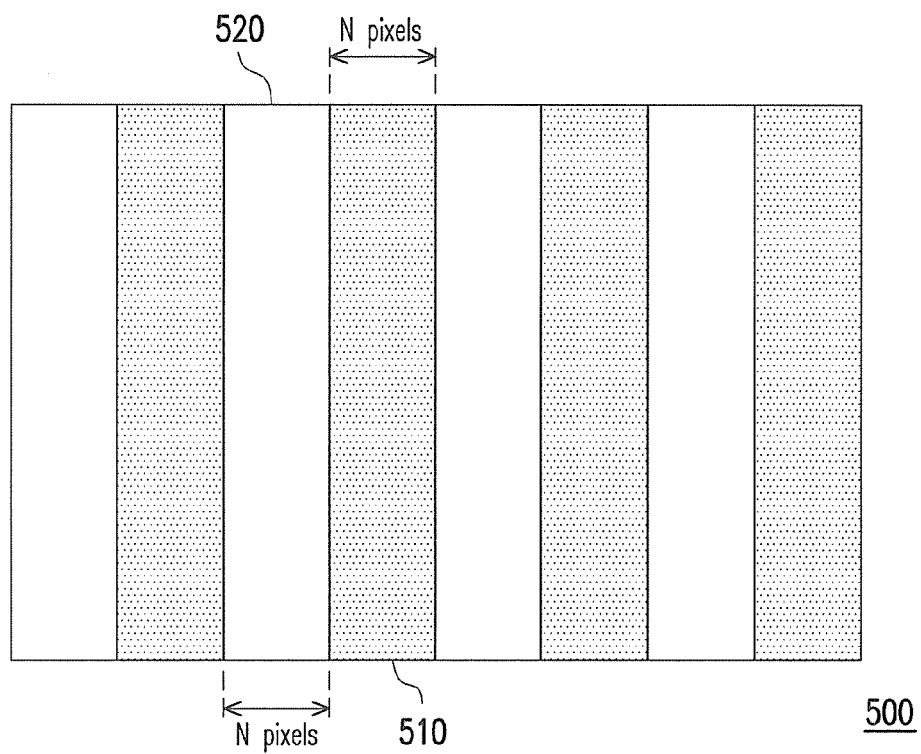
FIG. 5 is a CTF chart according to one embodiment of the present invention.

FIG. 5 is a CTF chart according to one embodiment of the present invention. The CTF chart 500 is the graph provided by the CTF chart sheet 326 of FIG. 3B, which consists of a bar pattern of alternately arranged black and white bars. Each black bar (e.g. black bar 510) or each white bar (e.g. white bar 520) has a width of N pixels, where N is a positive integer. The test image shot by the camera device 350 is of this type of graph.

Figure 6:
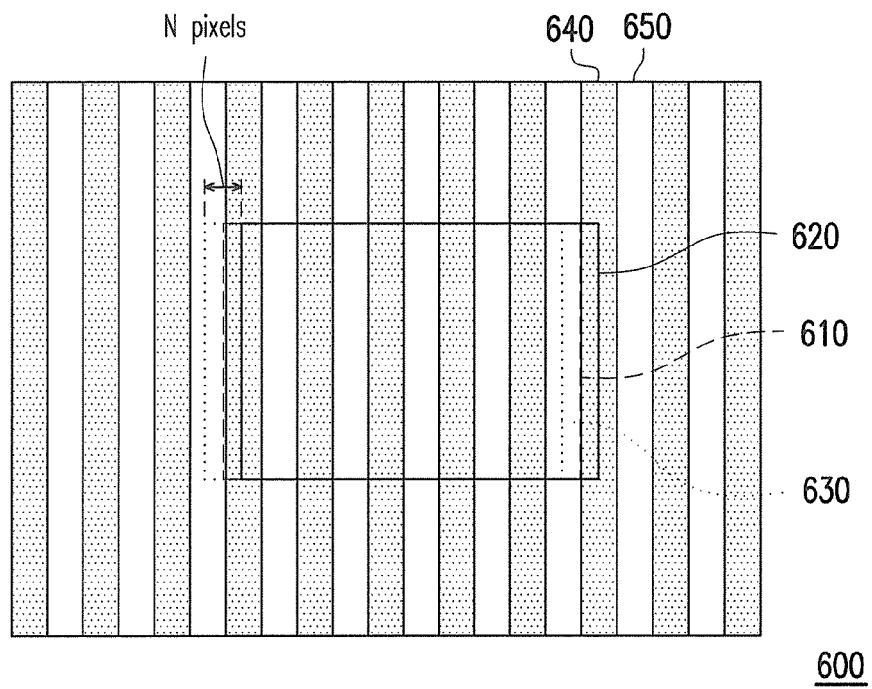
FIG. 6 illustrates a resolution test according to one embodiment of the present invention.

FIG. 6 is a view illustrating the resolution test according to one embodiment of the present invention. The analysis module 340 uses an analyzing window to frame a specific area of the test image 600 for calculating a high-pass element. In this embodiment, the width of each black bar and each white bar is N pixels, where N is a positive integer. First, the analyzing window selects a static area 610 and then shifts a specific distance in a first direction to a first area 620 (step S408). The analysis module 340 then analyzes a high-pass element of the first area 620 to generate a first high-pass element (step S410). The first high-pass element is a first calculation result that is calculated on the first area 620 using a symmetric high-pass filter. The analysis module 340 shifts the analyzing window back to the static area 610 (step S412) and then shifts the analyzing window a specific distance in a second direction to a second area 630 (step S414). The analysis module 340 then analyzes a high-pass element of the second area 630 to generate a second high-pass element (step S416). The second high-pass element is a second calculation result that is calculated on the second area 630 using a symmetric high-pass filter.

The first direction and the second direction are opposite and parallel to each other, and are spaced a distance of N pixels. In this embodiment, the first direction is a leftward direction and the second direction is a rightward direction. In addition, the first area 620 and the static area 610 are spaced a distance of X pixels, and the second area 630 and the static area 610 are spaced a distance of Y pixels, where X+Y=N, and X and Y are each an integer. The first area 620 and the second area 630 are parallel and spaced a distance of N pixels.

The analysis module 340 generates a third high-pass element according to the values of the first high-pass element and the second high-pass element (step S418). In this embodiment, the third high-pass element is an average of the first high-pass element and the second high-pass element. The resolution of the camera device 350 is then defined by converting the third high-pass element according to an equation embedded in the system (step S420).

Figure 7:
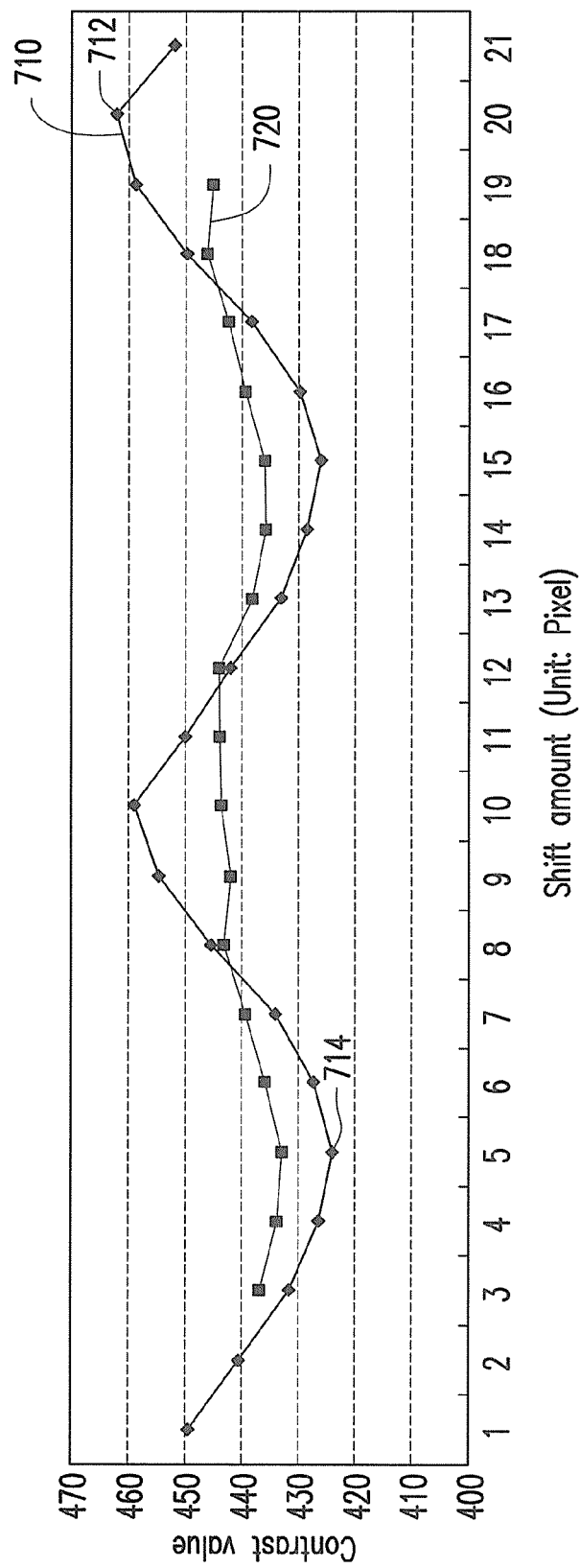
FIG. 7 is a curve diagram showing the contrast value test results according to one embodiment of the present invention.

FIG. 7 is a curve diagram showing the contrast value test results according to another embodiment of the present invention. Referring to FIG. 6 and FIG. 7, the horizontal axis represents the shift amount in units of pixels. A computing area is selected by increasing one pixel each time. The vertical axis represents the contrast values. The curve 710 illustrates the contrast value results measured using a conventional method. Each point on the curve 710 is resulted by calculating a high-pass element of a static area on the test image 600 and converting this high-pass element into a contrast value of the vertical axis using an equation embedded in the system. As can be seen from the curve 710, the measured contrast values are unstable; the contrast value of each static area on the same test image varies significantly.

Values on the curve 720 are measured by the resolution test device and method of the present invention. As in the method of FIG. 6, each point on the curve 720 is obtained using the following method: a static area is selected; an analyzing window is shifted X pixels rightwards to calculate a first high-pass element; the analyzing window is shifted back to the static area and then shifted Y pixels leftwards to calculate a second high-pass element; a third high-pass element is obtained by calculating an average of the first high-pass element and the second high-pass element; and the third high-pass element is converted into the contrast value of the vertical axis using an equation embedded in the system.

In other words, each test result on the curve 720 is an average of two calculated high-pass elements. For the curve 710 and the curve 720, for example, the contrast value corresponding to the highest point 712 of the curve 710 is too large, while the contrast value corresponding to the lowest point 714 is too small. On the contrary, as can be seen from the curve 720 that is resulted by the resolution test device and method of the present invention, each test result of the contrast values falls between the highest point 712 and the lowest point 714, without being too large or too small. In addition, the curve 720 is gentler than the curve 710 which represents fluctuating contract values. As such, the contrast values measured by the resolution test device and method of the present invention have improved stability.

Figure 1:
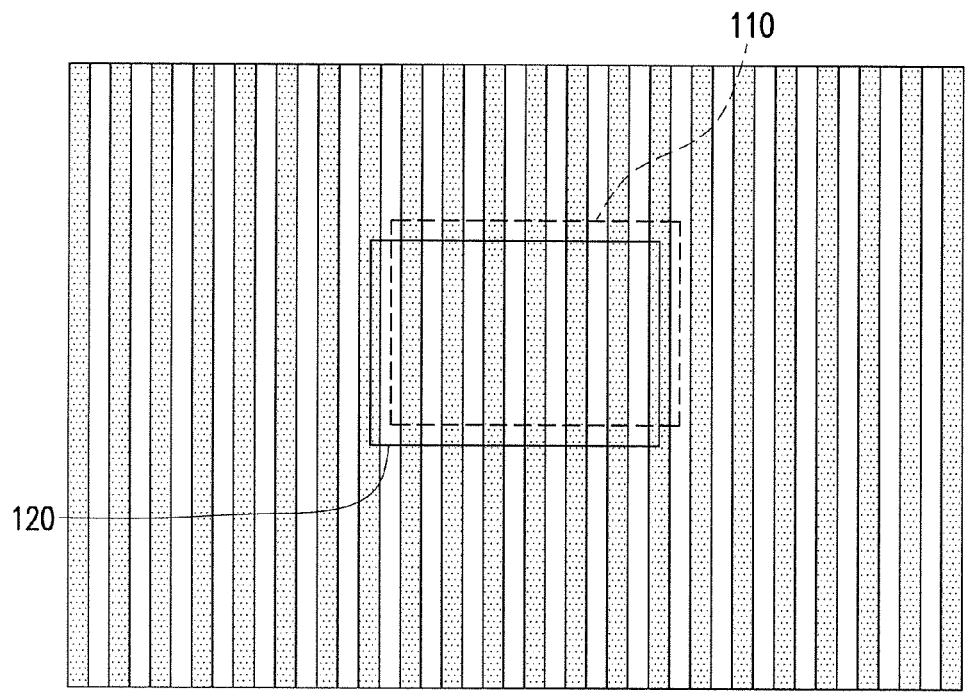
FIG. 1 is a diagram illustrating a conventional resolution test.
Figure 2:
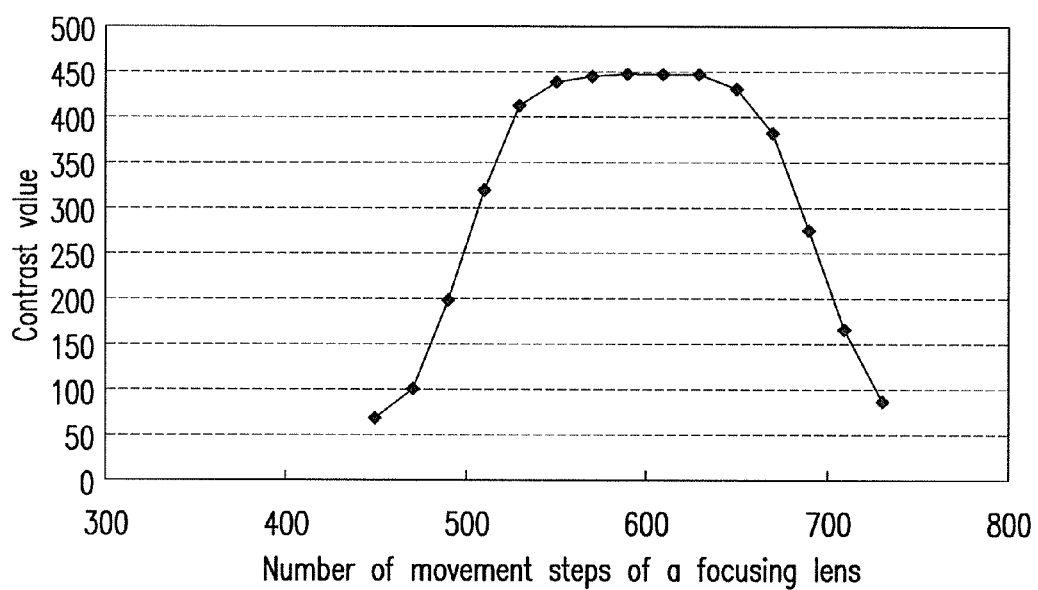
FIG. 2 is a curve diagram showing the contrast value results of the conventional test.
Figure 8:
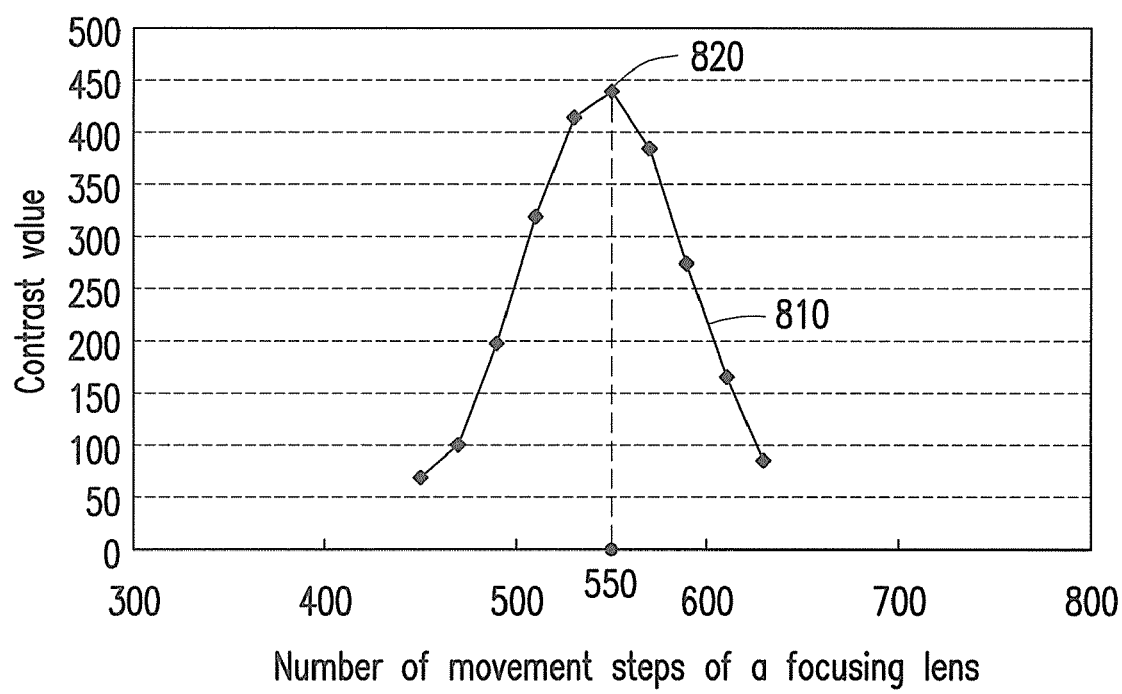
FIG. 8 is a curve diagram showing the contrast value test results according to another embodiment of the present invention.

FIG. 8 is another curve diagram showing the contrast value test results according to one embodiment of the present invention. The tests illustrated in FIG. 8 and FIG. 2 use the same low frequency CTF chart. The horizontal axis represents the number of movement steps of a focusing lens, and the vertical axis represents the contrast values. FIG. 2 uses the aforementioned conventional test method and the test results are such that multiple different focusing lens movement step numbers correspond to one same contrast value. As a result, the test results are inaccurate. FIG. 8 uses the resolution test device and method of the present invention. In comparison with FIG. 2, on the curve 810, there is one specific number of focusing lens movement steps (step number 550 in this embodiment) corresponding to a highest point 820 of the curve 810. This means this number of the focusing lens movement steps may correspond to a highest contrast value (i.e. a maximum contrast value, i.e. the focal point, can be found using this method). In other words, the resolution test device and method of the present invention can obtain high accuracy.

The contrast value mentioned in FIG. 7 and FIG. 8 is one of the determination criteria for resolution of a camera device. The measured contrast value may be converted into a value corresponding to the resolution of the camera device using a conversion equation known in the art, which is not repeated therein.

In summary, the present invention provides a resolution test device and a method thereof. In this device and method, a symmetric high-pass filter is used to calculate resolutions of two parallel areas at left and right sides of a static area. The two parallel areas are spaced a distance of N pixels. The resolutions of the two areas are averaged to reduce errors to a minimum, thus achieving stability and accuracy of the resolution being tested. In addition, while a low frequency CTF chart is used to test the resolution of the camera device, the test can still achieve the high stability and high accuracy which would conventionally require a high frequency CTF chart to achieve. Moreover, using the low frequency CTF chart for the test can reduce the cost of the fixture for testing of the camera device's resolution.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A resolution test device, adapted for testing a resolution of a camera device, the resolution test device comprising:
   a test module, adapted for providing a graph and causing the camera device to shoot a test image of the graph; and
   an analysis module, coupled to the camera device and adapted for capturing the test image shot by the camera device, shifting an analyzing window of the analysis module a specific distance in a first direction from a static area to a first area on the test image, analyzing the first area to generate a first high-pass element, shifting the analyzing window back to the static area, shifting the analyzing window the specific distance in a second direction from the static area to a second area on the test image, analyzing the second area to generate a second high-pass element, generating a third high-pass element according to the first high-pass element and the second high-pass element, and defining the resolution of the camera device according to the third high-pass element.

2. The resolution test device according to claim 1, wherein the test module comprises:
   a graph unit, providing the graph and uniform illumination; and
   a fixture unit, fixing the camera device, and causing the camera device to shoot the test image of the graph.

3. The resolution test device according to claim 1, wherein the first direction and the second direction are opposite and parallel to each other.

4. The resolution test device according to claim 1, wherein the graph is a contrast transfer function chart consisting of a bar pattern of multiple alternately arranged black bars and white bars, the width of each black bar and each white bar is N pixels, the specific distance of the shift in the first direction is X pixels, the specific distance of the shift in the second direction is Y pixels, where X+Y=N, and X and Y are each an integer, the first direction and the second direction are parallel and spaced a distance of N pixels.

5. The resolution test device according to claim 4, wherein the first high-pass element is a first calculation result calculated on the first area using a symmetric high-pass filter, and the second high-pass element is a second calculation result calculated on the second area using the symmetric high-pass filter.

6. The resolution test device according to claim 1, wherein the third high-pass element is an average of the first high-pass element and the second high-pass element.

7. A resolution test method adapted for testing a resolution of a camera device, the resolution test method comprises:
   providing a graph;
   causing the camera device to shoot a test image of the graph;
   capturing the test image shot by the camera device;
   shifting an analyzing window a specific distance in a first direction from a static area to a first area on the test image;
   analyzing the first area to generate a first high-pass element;
   shifting the analyzing window back to the static area;
   shifting the analyzing window the specific distance in a second direction from the static area to a second area on the test image;
   analyzing the second area to generate a second high-pass element;
   generating a third high-pass element according to the first high-pass element and the second high-pass element; and
   defining the resolution of the camera device according to the third high-pass element.

8. The resolution test method according to claim 7, wherein the first direction and the second direction are opposite and parallel to each other.

9. The resolution test method according to claim 7, wherein the graph is a contrast transfer function chart consisting of a bar pattern of multiple alternately arranged black bars and white bars, the width of each black bar and each white bar is N pixels, the specific distance of the shift in the first direction is X pixels, the specific distance of the shift in the second direction is Y pixels, where X+Y=N, and X and Y are each an integer, the first direction and the second direction are parallel and spaced a distance of N pixels.

10. The resolution test method according to claim 9, wherein the first high-pass element is a first calculation result calculated on the first area using a symmetric high-pass filter, and the second high-pass element is a second calculation result calculated on the second area using the symmetric high-pass filter.

11. The resolution test method according to claim 7, wherein the third high-pass element is an average of the first high-pass element and the second high-pass element.

* * * * *